March 17, 1936.  W. S. BRIAN  2,034,021
POWER TRANSMISSION DEVICE
Original Filed Oct. 5, 1932  2 Sheets-Sheet 1
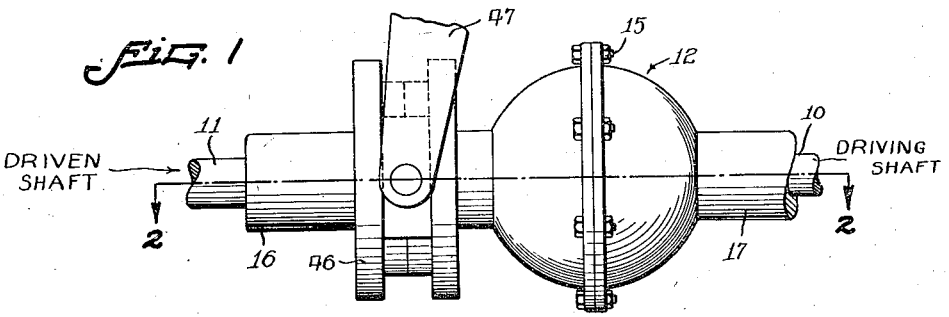
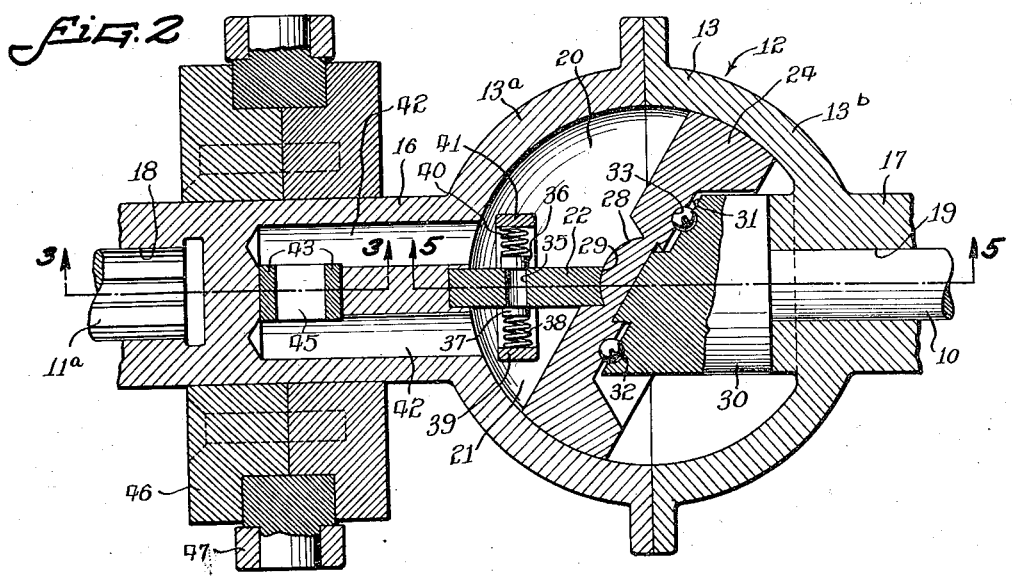
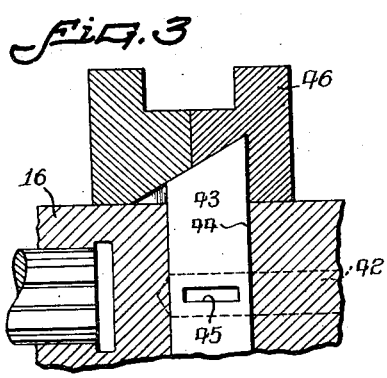
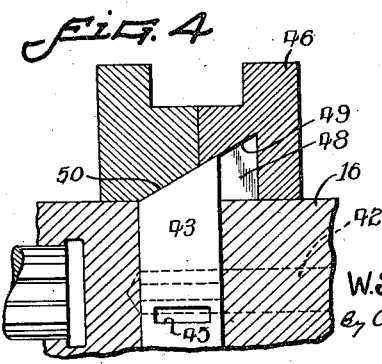
Inventor
W. Stanley Brian

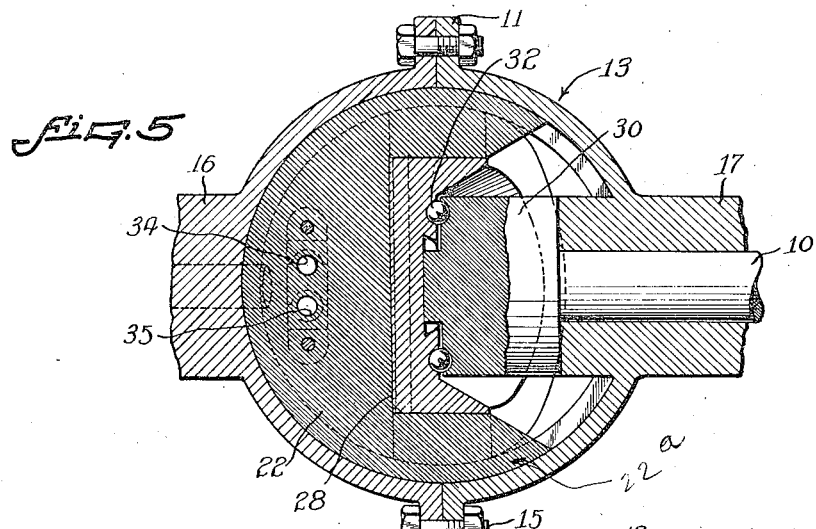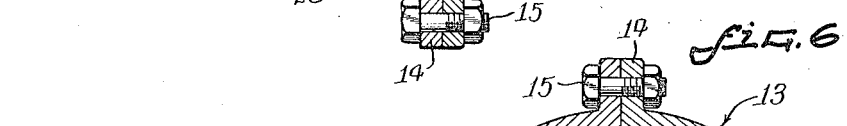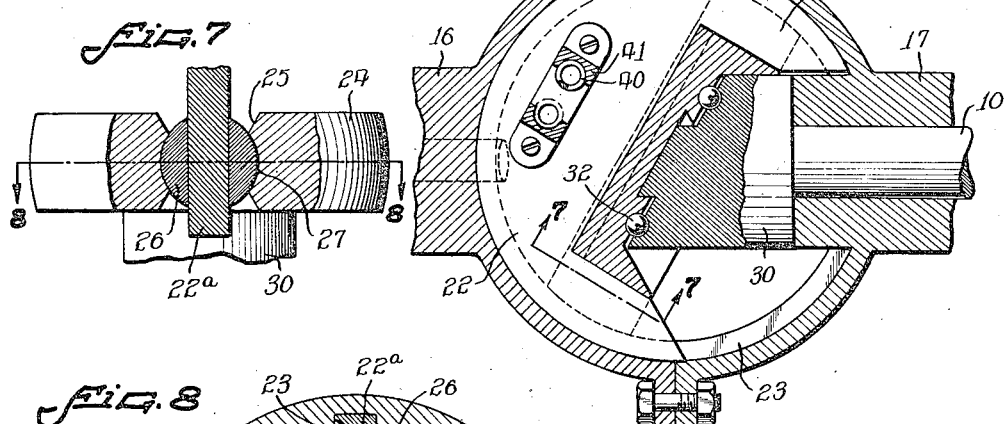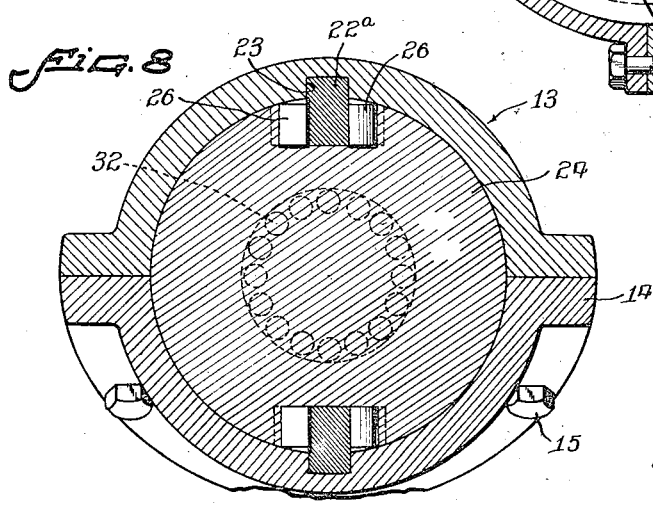

Patented Mar. 17, 1936

2,034,021

UNITED STATES PATENT OFFICE 2,034,021

POWER TRANSMISSION DEVICE

William Stanley Brian, Oak Park, Ill.

Application October 5, 1932, Serial No. 636,271
Renewed August 9, 1935

8 Claims. (Cl. 192—58)

The invention relates generally to power transmission devices, and the primary object of the present invention is to provide an improved and simplified hydraulic variable-speed transmission device which is particularly adapted for use in automobiles.

Another object is to provide such a hydraulic variable-speed transmission wherein the transmission ratio is varied gradually and automatically in response to variation in the resistance or load impressed upon the driven shaft.

Another object is to provide a new and improved automatically operable variable-speed transmission having means for enabling and disabling the driving connection between the driving and driven shafts so as to start and stop the driven shaft.

Other objects and advantages will become apparent from the following detailed description taken in connection with the accompanying drawings which illustrate a preferred embodiment of the invention and in which:

Figure 1 is a side elevational view of a power transmission device embodying the features of the invention.

Fig. 2 is an enlarged longitudinal sectional view taken along the line 2—2 of Fig. 1.

Figs. 3 and 4 are fragmental sectional views taken along the line 3—3 of Fig. 2 and showing the manual control valve in two different positions.

Fig. 5 is a sectional view taken along the line 5—5 of Fig. 2.

Fig. 6 is a view similar to Fig. 2 showing the casing and the wobble plate rotated through 90° with respect to the driving shaft.

Fig. 7 is a fragmental view taken in section along the line 7—7 of Fig. 6.

Fig. 8 is a sectional view taken along the line 8—8 of Fig. 7.

While the invention may be employed wherever a variable-speed driving connection is required, the embodiment herein illustrated is intended and particularly adapted for use as an automobile transmission between a driving shaft 10 connected to the motor (not shown) and a driven shaft 11 connected to the wheels (not shown) of the automobile. The shafts 10 and 11 are alined and interposed therebetween is a power transmission device 12. The transmission device comprises a hollow spherical casing 13 consisting of two semi-spherical sections 13ª and 13ᵇ flanged at 14 at their adjacent edges and secured together by bolts 15. At opposite sides of the sections 13ª and 13ᵇ integral hubs or stub shafts 16 and 17 are formed, projecting in alinement and in opposite directions from the casing 13. The stub shaft 16 has formed therein a splined axial socket 18 into which the splined end 11ª of the driven shaft 11 projects so as to fix the casing 13 non-rotatably to the shaft 11. The shaft 17 has an axial bore 19 through which the end of the driving shaft 10 extends in rotatable relation to the casing 13 and the driven shaft 11.

Within the casing 13 means is provided for forming a rotation-transmitting connection between the shaft 10 and the casing 13 whereby to drive the shaft 11 from the shaft 10. This means is hydraulic in character and provides for variation of the transmission ratio between the two shafts and such variation is preferably obtained automatically in accordance with the load impressed on the driven shaft 11.

In the present instance the hydraulic rotation transmitting connection is such that relative rotation of the two shafts causes circulatory movement of a suitable non-freezing uncompressible fluid within the casing 13 and along a variably restricted path. Hence when the driving shaft 10 and the driven shaft 11 are rotating at synchronous speeds and substantially without load, there is no circulation of the fluid along its restricted path. The impression of a load or retarding force upon the driven shaft 11 causes pressure to be built up in the fluid in the casing and fluid is caused to circulate along the restricted path and relative rotation of the two shafts is permitted whereby to decrease the speed or transmission ratio between the shafts 10 and 11 and thereby cause an increase in the power transmitted so as to overcome or balance the impressed load.

To provide for circulation of the fluid within the casing 13 during relative rotation of the shafts 10 and 11, means is provided within the casing forming two chambers 20 and 21 which are varied in volume by such relative rotation of the shafts so as to cause flow of the fluid back and forth between the two chambers. The chambers 20 and 21 are in the present instance formed on opposite sides of a segmental division wall 22 lying in a plane passing through the axis of the shafts 10 and 11 with its peripheral edges slidably positioned in a guide groove 23 formed in the inner surface of the casing 13.

Between the wall 22 and the inner end of the driving shaft 10 a wobble plate 24 is mounted, generally in a transverse relation to the division wall 22. The wobble plate 24 is non-rotatable with respect to the casing 13 by reason of extensions 22ª of the wall 22 (Figs. 6 to 8) which project through slots 25 formed in opposite edges of the plate 24. Relative wobbling or gyratory movement of the plate 24 and wall 22 is permitted by bearings 26 positioned in sliding relation to the wall 22 and in rocking relation to arcuate seats 27 formed in the sides of the slots 25 in the plate 24.

In the rocking movement of the plate 24 about the bearings 26 (Fig. 7) a tight joint is maintained between the plate 24 and the wall 22 intermediate the two slots 25 by means of an elongated convex bearing surface 28 (Fig. 2) formed on the plate 24 and engaging a complemental concave surface 29 formed on the opposed edge of the wall 22.

It will be apparent that the elongated bearing surfaces 28 and 29 must constantly be in contact with each other during the gyratory movement of the plate 24 and due to this contact with wall 22 is oscillated in the groove 23 as will be evident from a comparison of Figs. 5 to 6.

To impart the desired wobbling movement to the plate 24 any desired form of connection may be employed between the plate 24 and the driving shaft 10. In the present case the shaft 10 has a head 30 thereon within the casing 13 with an end surface 31 positioned at an angle to the axis of the shaft and bearing rotatably against the adjacent recessed surface of the plate 24 through the medium of anti-friction members 32 running in annular grooves 33 in the head and plate.

The chambers 20 and 21 are of such a character that their volumes are constantly varied during relative rotation of the shafts 10 and 11 and it will be evident that when passage of the fluid between the chambers is prevented, the two shafts will be locked together and a one to one transmission ratio will result.

To permit variation of this direct drive ratio, flow of fluid between the chambers 21 and 22 is permitted, and this is accomplished by suitable restricted ports 34 and 35 formed in the division wall 22 and controlled respectively by shiftable valves 36 and 37. In its flow from the chamber 20 to the chamber 21 the fluid passes through the port 35 and acts against and opens the valve 37 which is normally held in its closed position by a spring 38 acting between the valve 37 and a bracket 39 fixed on the wall 22. A similar spring 40 mounted on a bracket 41 opposes opening of the valve 36 in the passage of fluid through the port 34 from the chamber 21 to the chamber 20. The valves 36 and 37, being spring pressed toward their closed positions, serve as means for variably restricting their ports and thereby impart a greater range of variation in the flow of fluid through the ports.

In order to stop the rotation of the shaft 11, free movement of the fluid between the chambers 20 and 21 is permitted through a suitable by-pass consisting of parallel bores 42 extending from the chambers 20 and 21 into the stub shaft 16 and communicating with each other under the control of a manually shiftable valve 43. The valve 43 is slidable transversely through the stub shaft 16 in a guide passage 44 which intersects and communicates with the two bores 42, and a port 45 extending through the valve 43 is moved into and out of connecting relation to the two bores 42 by shifting of the valve 43.

Such shifting of the valve is obtained by a grooved collar 46 surrounding and slidable longitudinally of the stub shaft 16 under the control of a conventional shifting yoke 47. In the inner surface of the collar 46 suitable cam recesses 48 (only one shown) are formed at opposite ends of the valve 43 with oppositely disposed angular cam surfaces 49 engaging oppositely disposed angular end surfaces 50 formed on the valve 43. Thus by shifting the collar 46 from the position of Fig. 4 to the position of Fig. 3, the valve 43 may be shifted transversely of the stub shaft 16 to move the port 45 into registration with the bores 42 and the by-pass opened and free rotation of the shaft 10 permitted, thereby stopping the movement of the shaft 11.

In the operation of the device, the by-pass valve 43 is opened to permit the shaft 11 to remain stationary during rotation of the driven shaft 10. While the valve 43 is open the wobble plate 24 and the associated division wall 22 are oscillated and the volumes of the chambers 20 and 21 are varied so as to force the fluid back and forth through the by-pass.

When it is desired to start rotation of the shaft 11 the by-pass valve 43 is closed. The load on the shaft 11, of course, resists rotation of that shaft, thus building up pressure in one of the two chambers so as to cause a relatively great opening of one of the valves 36 or 37 to permit flow of fluid from one chamber to the other. This permits relative rotation of the two shafts 10 and 11 and a rotation transmitting connection is formed to the shaft 11 at a power-multiplying ratio which will overcome the resistance torque of the load and start rotation of the shaft 11. As the load is decreased, due to reduction of inertia or other causes, the pressure within the chambers 20 and 21 is decreased, the valve opening is correspondingly and automatically reduced by the action of the springs 38 and 40 and the amount of relative rotation between the shafts 10 and 11 is decreased, thereby increasing the relative speed of the driven shaft 11. This change continues as governed by the impressed load and it approaches a one to one driving ratio between the two shafts 10 and 11. To break the driving connection, the valve 43 is again opened to establish the by-pass communication between the chambers 20 and 21.

I claim as my invention:

1. A variable-speed power transmission device comprising a spherical casing to be driven, a drive shaft extending rotatably into said casing, a wobble plate mounted for oscillation in said casing and fixed against rotation relative to the casing about the axis of said shaft, a connection between said shaft and said plate operable in relative rotation of said shaft and said casing to impart wobbling movement to said plate, a division wall within said casing mounted for oscillation about an axis perpendicular to said wall and to the axis of said shaft and arranged to rotate with said casing and plate, and said wall cooperating with said plate to form two fluid filled chambers the volumes of which are varied during relative rotation of the shaft and the casing, and means providing a restricted path of circulation for fluid between the said chambers.

2. A device of the character described comprising a spherical casing, a shaft extending rotatably into said casing, a wobble plate mounted for oscillation in said casing and fixed against rotation therein about the axis of said shaft, a connection between said shaft and said plate operable in relative rotation of said shaft and said casing to impart wobbling movement to said plate, a division wall mounted within said casing substantially parallel to the axis of said shaft for shifting movement about an axis perpendicular to said wall and arranged to rotate with said casing and plate, and cooperating with said plate to form two fluid filled chambers the volumes of which are varied during relative rotation of the shaft and the casing, and means providing a restricted path of circulation for fluid between the said chambers.

3. A device of the character described comprising driving and driven shafts, a casing non-rotatably connected to one of said shafts, the other of said shafts extending into the casing in rotatable relation thereto, a wobble plate non-rotatably mounted within said casing, a connection between said other shaft and said plate operable in relative rotation of said other shaft and said casing to cause wobbling movement of said plate, said casing having a spherically formed inner surface against which the edge of said plate slides, a division wall in said casing and bearing against said plate on the side opposite from said other shaft and providing, with said casing and plate, two substantially liquid tight chambers, the volumes of which are varied during relative rotation of the two shafts, the bearing surfaces between the plate and the wall being formed to provide for pivotal movement of the plate relative to the wall, means fixing said wall against transverse movement and providing a sliding bearing permitting shifting of the wall about an axis perpendicular to the wall, fluid filling said chambers, and means providing a restricted path along which the fluid may be forced back and forth between said chambers.

4. A device of the character described comprising a spherical casing, a shaft extending rotatably into said casing, a wobble plate mounted within said casing substantially transverse to the axis of said shaft, a division wall mounted within said casing substantially parallel to the axis of said shaft, means supporting said wall against lateral movement and providing a bearing for shifting movement of the wall in said casing about an axis perpendicular to said wall, means acting between said wall and said plate to prevent rotation of said plate, said wall and said plate cooperating to form two fluid filled chambers the volumes of which are varied during wobbling movement of the plate, a connection between said shaft and said plate operable in relative rotation of said shaft and said casing to impart wobbling movement to said plate, and means providing a restricted path of circulation for fluid between the said chambers.

5. A variable-speed power transmission device comprising driving and driven shafts, a casing non-rotatably connected to one of said shafts, means operatively connected to the other of said shafts and cooperating with said casing to provide two fluid filled chambers, the volumes of which are varied during relative rotation of the two shafts, means providing two passages to permit liquid to flow between the two chambers, and check valves closing said passages and having springs normally pressing said valves toward their closed positions.

6. A device of the character described comprising driving and driven shafts, a casing non-rotatably connected to one of said shafts, the other of said shafts extending into the casing in rotatable relation thereto, means operatively connected to said last mentioned shaft within said casing and cooperating with said casing to provide two substantially liquid-tight chambers, the volumes of which are varied during relative rotation of the two shafts, fluid filling said chambers, means providing two passages connecting said two chambers, oppositely disposed check valves controlling said passages, a by-pass connecting said two chambers, and a manually shiftable valve for controlling said by-pass.

7. A device of the character described comprising driving and driven shafts, a casing non-rotatably connected to one of said shafts, the other of said shafts extending into the casing in rotatable relation thereto, means operatively connected to said last mentioned shaft within said casing and cooperating with said casing to provide two substantially liquid-tight chambers, the volumes of which are varied during relative rotation of the two shafts, fluid filling said chambers, means providing two passages connecting said two chambers, a by-pass connecting said two chambers and a manually shiftable valve for controlling said by-pass.

8. A device of the character described comprising driving and driven shafts, a casing non-rotatably connected to one of said shafts, the other of said shafts extending into the casing in rotatable relation thereto, means operatively connected to said last mentioned shaft within said casing and cooperating with said casing to provide two fluid filled substantially liquid-tight chambers, the volumes of which are varied during relative rotation of the two shafts, means providing two restricted passages connecting said two chambers, a by-pass connecting said two chambers, a shiftable valve for controlling said by-pass mounted for rotation with one of said shafts, and means for manually shifting said valve during rotation of said last mentioned one of the shafts.

WILLIAM STANLEY BRIAN.